Figure 1:
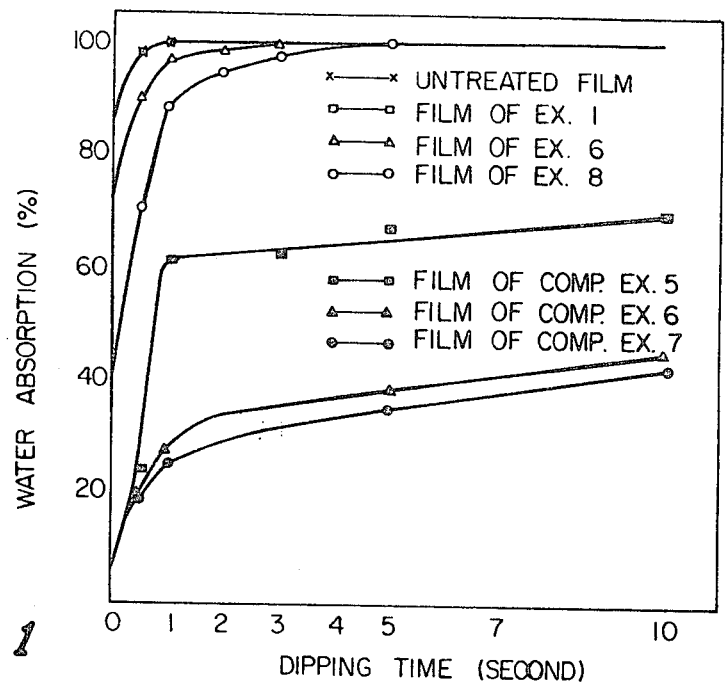

United States Patent [19]

Doi et al.

[11] 4,331,622

[45] * May 25, 1982

[54] METHOD FOR MANUFACTURING A MICROPOROUS FILM HAVING LOW ELECTRICAL RESISTANCE AND HIGH DURABILITY

[75] Inventors: Yoshinao Doi, Kawasaki; Osamu Fujii, Tachikawa; Shigeo Kaneko; Takeo Hanamura, both of Tokyo, all of Japan

[73] Assignee: Asahi Kasei Kogyo Kabushiki Kaisha, Osaka, Japan

[ * ] Notice: The portion of the term of this patent subsequent to Jul. 1, 1997, has been disclaimed.

[21] Appl. No.: 111,971

[22] Filed: Jan. 14, 1980

Related U.S. Application Data

[62] Division of Ser. No. 929,983, Aug. 1, 1978, Pat. No. 4,210,709.

[51] Int. Cl.$^3$ .................. B29D 27/00; H01M 2/16
[52] U.S. Cl. .................. 264/45.3; 264/41; 429/250; 429/251; 429/254
[58] Field of Search .......... 264/41, 49, 129, 45.3; 429/250, 251, 254

[56] References Cited

U.S. PATENT DOCUMENTS

| | | | |
|---|---|---|---|
| 3,351,495 | 11/1967 | Larsen et al. | 264/49 X |
| 3,853,601 | 12/1974 | Taskier | 429/250 X |
| 3,929,509 | 12/1975 | Taskier | 429/250 |
| 4,190,707 | 2/1980 | Doi et al. | 264/49 X |
| 4,210,709 | 7/1980 | Doi et al. | 429/250 |

FOREIGN PATENT DOCUMENTS

| | | |
|---|---|---|
| 2627229 | 3/1978 | Fed. Rep. of Germany . |
| 46-19557 | 6/1971 | Japan ................. 264/49 |

OTHER PUBLICATIONS

Brydson, J. A. "Plastics Materials" Princeton, N.J., D. Van Nostrand, c 1966, pp. 64–69.

*Primary Examiner*—Philip Anderson
*Attorney, Agent, or Firm*—Armstrong, Nikaido, Marmelstein & Kubovcik

[57] ABSTRACT

A microporous film which comprises a matrix comprising 40 to 90 volume percent of a polyolefin having a number average molecular weight of 15,000 or more and 10 to 60 volume percent of an inorganic filler, said matrix having therein void spaces at a rate of 30 to 75 volume percent based on the volume of the film; and 2 to 20 weight percent, based on the total weight of the polyolefin and the inorganic filler, of an organic substance which is substantially insoluble in and inert to sulfuric acid and has a solubility parameter ranging from 7.3 inclusive to 8.4 exclusive; said organic substance, in its majority, adhering to the overall surface of the film including the outer surfaces of the film and the surfaces of the polyolefin walls defining said void spaces in cooperation with said inorganic filler.

33 Claims, 3 Drawing Figures

METHOD FOR MANUFACTURING A MICROPOROUS FILM HAVING LOW ELECTRICAL RESISTANCE AND HIGH DURABILITY

This is a division, of application Ser. No. 929,983, filed Aug. 1, 1978, now U.S. Pat. No. 4,210,709.

This invention relates to the preparation of a microporous film which is excellent in mechanical strength and flexibility as well as wettability and oxidation resistance and a method for manufacturing the same. More particularly, the present invention is concerned with a microporous film which comprises a matrix comprising a polyolefin and an inorganic filler and having therein a vast plurality of fine pores or void spaces, and an organic substance adhering to the overall surface of the matrix which substance is substantially insoluble in and inert to an acid and has a specified value of solubility parameter, and a method for manufacturing the same.

Heretofore, there have been proposed various kinds of porous films, for example, a porous film prepared by the method in which a blend of a polyvinyl chloride resin, a solvent for the resin, a plasticizer and silica is kneaded and molded into a film, followed by drying, and a porous film prepared by sintering a mixture of polyvinyl chloride resin powder and finely divided silica. In a wide variety of applications, such resin-based porous films are utilized.

According to the intended uses, however, the conventional porous films are often insufficient in properties or characteristics. For example, there has recently been increased a use of porous films as a separator for a lead accumulator. In such use as a battery separator, the porous film is required to have not only a sufficient wettability and a small electrical resistance in the electrolyte but also an excellent durability, especially a high oxidation resistance as well as a high acid resistance.

In use, the battery separator of a lead accumulator is usually immersed in a 30 to 40% aqueous sulfuric acid solution of 70° to 80° C. It is further noted that at the time of charging, the battery separator is exposed to an oxidizing atmosphere due to active oxygen generated from the anode. Therefore, the battery separator is naturally required to have excellent oxidation resistance and acid resistance sufficient for enduring such drastic conditions.

As the porous films for use as a battery separator, there have been proposed for example, (1) a porous film prepared by sintering a mixture of polyvinyl chloride resin powder and finely divided silica; (2) a porous film prepared by impregnating a linter pulp with a phenolic resin; and (3) a porous film prepared by impregnating a non-woven fabric with a solution comprising a polyvinyl chloride resin, a solvent and a non-solvent, followed by drying. Any of these conventional porous films, however, is still insufficient in durability.

On the other hand, as the porous films specially developed to have a durability when used as a battery separator, there are known, for example, (4) a porous film prepared by incorporating in a rubber latex starch, sulfur and a vulcanizing accelerator and subjecting the resultant to vulcanization, followed by leaching-out of the starch; and (5) a porous film prepared by blending a polyolefin having a melt index of 0 (zero), silica and a petroleum oil and subjecting the resulting blend to melt-molding to form a sheet, followed by extraction of the petroleum oil from the sheet (see, for example U.S. Pat. No. 3,351,495). Such high durability porous films of (4) and (5) above, however, have another drawback that the electrical resistances of them are high.

Illustratively stated, in U.S. Pat. No. 3,351,495, the porous film is prepared by molding a blend of a polyolefin, silica and a petroleum oil into a film and extracting the petroleum oil from the molded film, leaving a part of the petroleum oil remain unextracted. The solubility parameter of a petroleum oil employed in this prior art is less than 8.4 and near to that of the polyolefin and therefore, the major portion of the petroleum oil employed permeates into the polyolefin. As a result, formation of pores is insufficient, unfavorably leading to increase in electrical resistance of the produced film.

With a view to realizing a porous film having a low electrical resistance as well as a high durability, extensive and intensive research works and investigations have been made. As a result, it has been found that when a film molded from a blend of a polyolefin, an inorganic filler and an organic liquid having a specified value of solubility parameter is subjected to extraction to leach out the organic liquid and then, a specific organic substance is applied to the overall surface of the film, there is obtained a porous film having not only a small electrical resistance, namely $\frac{1}{3}$ to 1/10 of that of the conventional porous film but also excellent durability and wettability. The present invention has been made, based on such novel finding.

Accordingly, it is an object of the present invention to produce a microporous film which has a small electrical resistance as well as a high durability.

It is another object of the present invention to produce a microporous film of the kind as mentioned above, which is extremely excellent in oxidation resistance and wettability.

It is a further object of the present invention to provide a method of manufacturing a microporous film of the character described, which can be simply, easily conducted.

It is a still further object of the present invention to produce a battery separator made of a microporous film of the above character.

Figure 3:
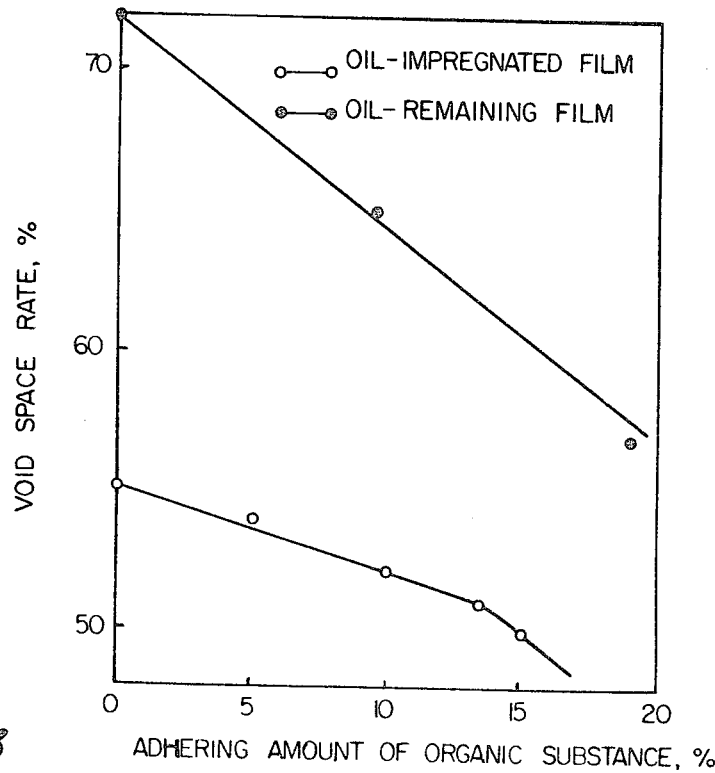
Figure 2:
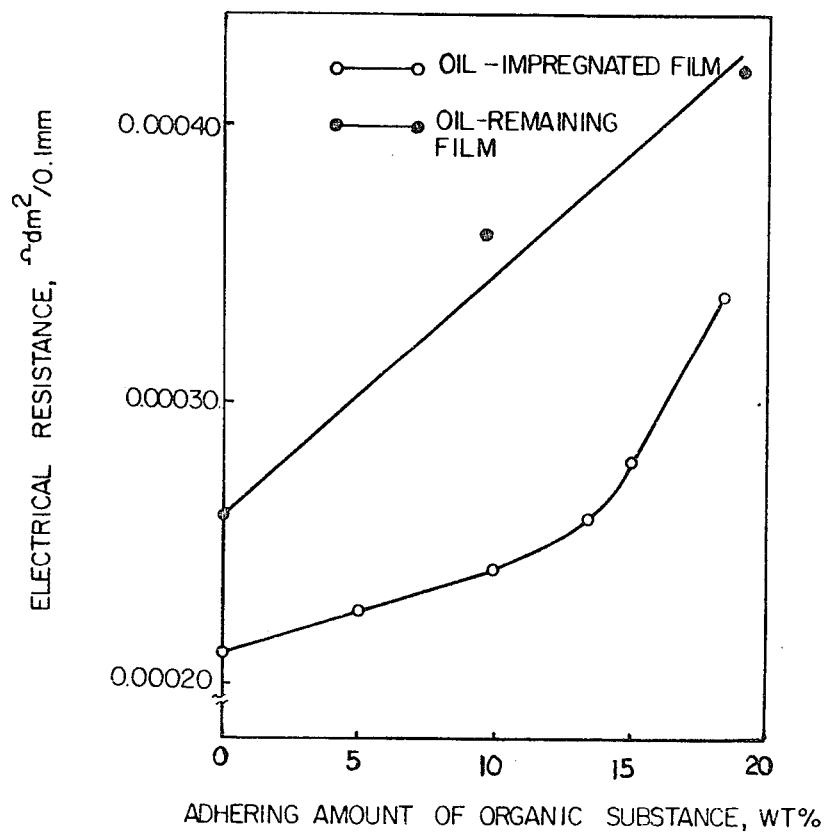

The foregoing and other objects, features and advantages of the present invention will be apparent to those skilled in the art from the following detailed description and appended claims taken in connection with the accompanying drawings in which:

FIG. 1 is a graph showing the relationship between the water absorption and the time of immersion in water, comparing the film of the present invention with that of U.S. Pat. No. 3,351,495;

FIG. 2 is a graph showing the relationship between the electrical resistance of the film and the process oil content, comparing the film of the present invention with that of U.S. Pat. No. 3,351,495; and FIG. 3 is a graph showing the relationships between the void space rate of the film and the process oil (employed as an organic substance for imparting oxidation resistance in the present invention and employed as an organic liquid for formation of pores in U.S. Pat. No. 3,351,495) content, comparing the film of the present invention with that of U.S. Pat. No. 3,351,495.

In one aspect of the present invention, there is provided a microporous film which comprises a matrix comprising 40 to 90 volume percent of a polyolefin having a number average molecular weight of 15,000 or more and 10 to 60 volume percent of an inorganic filler, said matrix having therein void spaces at a rate of 30 to 75 volume percent based on the volume of the film; and 2 to 20 weight percent, based on the total weight of the polyolefin and the inorganic filler, of an organic substance which is substantially insoluble in and inert to sulfuric acid and has a solubility parameter ranging from 7.3 inclusive to 8.4 exclusive; said organic substance, in its majority, adhering to the overall surface of the film including the outer surfaces of the film and the surfaces of the polyolefin walls defining said void spaces in cooperation with said inorganic filler.

In another aspect of the present invention, there is provided a method of manufacturing a microporous film which comprises: blending a polyolefin having a number average molecular weight of 15,000 or more, an inorganic filler, and an organic liquid having a solubility parameter ranging from 8.4 to 9.9 inclusive in amounts of 10 to 60 volume percent, 7 to 42 volume percent, and 30 to 75 volume percent, respectively, based on the whole volume of the polyolefinfiller-organic liquid composition, the amount of the polyolefin being ⅔ to 9 multiple of the amount of the inorganic filler; subjecting the resulting blend to molding to form a film; extracting from said film the organic liquid to form a matrix which comprises 40 to 90 volume percent of the polyolefin and 10 to 60 volume percent of the inorganic filler and having therein void spaces at a rate of 30 to 75 volume percent based on the volume of the film; and applying to the matrix an organic substance which is substantially insoluble in and inert to sulfuric acid and has a solubility parameter ranging from 7.3 inclusive to 8.4 exclusive so that said organic substance adheres to the overall surface of the film in an amount of 2 to 20 weight percent based on the total weight of the polyolefin and the inorganic filler.

The most characteristic feature of the present invention resides in that a filmy matrix comprising a polyolefin and an inorganic filler and having therein void spaces is first prepared and then, an organic substance which is substantially insoluble in and inert to sulfuric acid and has a solubility parameter (hereinafter often referred to simply as "SP") of from 7.3 inclusive to 8.4 exclusive is applied to the film so that said organic substance adheres to the overall surface of the film in an amount of 2 to 20 weight percent based on the total weight of the polyolefin and the inorganic filler. Illustratively stated, according to the present invention, 10 to 60 volume percent of a polyolefin, 7 to 42 volume percent of an inorganic filler and 30 to 75 volume percent of an organic liquid having an SP of from 8.4 to 9.9 inclusive are blended, the amount of the polyolefin being ⅔ to 9 multiple of the amount of the inorganic filler, and the resulting blend is subjected to molding to form a film, followed by extraction of the organic liquid from the film to obtain a filmy matrix having therein void spaces. Such filmy matrix is excellent in mechanical strength and flexibility and has a high porosity and a low electrical resistance. To the thus obtained filmy matrix with improved characteristics is then applied an organic substance which is substantially insoluble in and inert to sulfuric acid and has a SP of from 7.3 inclusive to 8.4 exclusive so that said organic substance adheres to the overall surface of the resulting microporous film in an amount of 2 to 20 weight percent based on the total weight of the polyolefin and the inorganic filler. In the thus obtained microporous film, the organic substance, in its majority, adheres to the overall surface of the microporous film including the outer surfaces of the film and the surfaces of the polyolefin walls defining said void spaces in cooperation with said inorganic filler, as will be explained later in more detail. Such microporous film is imparted with an excellent durability, especially a high oxidation resistance substantially without sacrifice of such properties as the excellent mechanical strength, flexibility and wettability as well as the low electrical resistance which properties the film has before the organic substance is applied thereto.

As described before, there is known from U.S. Pat. No. 3,351,495 a porous film prepared by molding a blend of a polyolefin, silica and a process oil into a film and extracting the petroleum oil from the molded film, leaving a part of the process oil as it remains unextracted. As quite different from such an oil-remaining type porous film, the microporous film according to the present invention is obtained through a so-called oil adhesion treatment and has both an excellent durability, especially oxidation resistance and a low electrical resistance as well as excellent wettability. In order to demonstrate superiority of the microporous film of the present invention, comparison will be frequently made in the present specification, with reference to the porous film according to U.S. Pat. No. 3,351,495.

As described, the microporous film of the present invention is featured by its high oxidation resistance, and has an oxidation resistance of 100 hours or more in terms of short-circuiting period of time in an oxidation resistance test that a film of 7 cm×7 cm is sandwiched under a load of 5 kg by lead plates of 5 cm×5 cm which serve as a cathode and an anode, respectively, put in a 50° C. aqueous sulfuric acid solution having a specific gravity of 1.30, and applied with a constant current of 2.5 A, to determine a period of time until the voltage drops by 0.2 V or more from the initial voltage or it drops to below 2.6 V, and which further has an oxidation resistance of 50% or more in terms of breaking elongation after 48 hours from the start of said oxidation resistance test. Such an oxidation resistance test can directly give such an oxidation resistance of the present microporous film as in the case where the film is employed as a battery separator, but can also give an index of such an oxidation resistance of the film as in the case where the film is employed in other applications because in the abovementioned test there is effected electrolysis of water to generate oxygen in the nascent state whereby the resistance of the film to such active oxygen is eventually measured.

The term "organic substance which is substantially insoluble in and inert to sulfuric acid" as used herein is intended to mean such an organic substance that after 100 ml. of the organic substance is added to 1 liter of a 40% aqueous sulfuric acid solution and the resulting mixture is allowed to stand at 80° C. for 5 days, at least 70% of the organic substance can be recovered without dissolution, reaction and decomposition with respect to the sulfuric acid, by separation using such a general physical separation method as filtration, separation by means of a separating funnel, centrifugal separation, etc. exclusive of distillation.

The solubility parameter of the organic substance to be employed in the present invention should be in the range of from 7.3 inclusive to 8.4 exclusive, more preferably 7.5 to 8.3 inclusive.

As described before, upon being applied to the film, the organic substance adheres, in its majority, to the overall surface of the film including the outer surfaces of the film and the surfaces of the polyolefin walls defining the void spaces formed in the film in cooperation with the inorganic filler. Thus, for example when the microporous film of the present invention is employed as the separator for a lead accumulator, the organic substance serves to protect the film from the oxidizing atmosphere in the electrolyte of the accumulator, thereby imparting to the film a high oxidation resistance effective for a long time. For attaining such protection of the film, the organic substance to be employed is required to be substantially insoluble in and inert to sulfuric acid and to firmly adhere to the overall surface of the film.

When the organic substance having a SP of 7.3 inclusive to 8.4 exclusive is applied, according to the present invention, to the film comprising a polyolefin the SP of which is in the range of from 7.7 to 8.2, the organic substance is caused to firmly adhere, in its majority, selectively to the overall surface of the film, exclusively of the surface of the inorganic filler, due to affinity of the organic substance to the polyolefin because the SP value of the organic substance in near to that of the polyolefin. The organic substance thus adhering to the surface of the film, naturally, is substantially insoluble in and inert to sulfuric acid, for example in the battery electrolyte of sulfuric acid because the SP value of the organic acid is small as compared with that of sulfuric acid. Accordingly, a prolonged protection effect for the film can be realized.

If the SP value of the organic substance is 8.4 or more, the organic substance once adhering to the film is liable to be liberated because the SP value of the organic substance is far apart from that of the polyolefin. Further, the larger the SP value, the more the polarity of the organic substance becomes. For this reason, the organic substance having an SP of 8.4 or more is liable to dissolution or hydrolysis with respect to sulfuric acid, leading to decrease in retention of the protective effect for the film.

On the other hand, if the SP value of the organic substance is less than 7.3, the organic substance once adhering to the film is liable to be liberated from the film, for example in the battery electrolyte of the sulfuric acid due to less affinity of the organic substance to the polyolefin because the SP value of the organic substance is far apart from that of the polyolefin. As a result, a prolonged protective effect for the film cannot be expected.

The amount of the organic substance adhering to the overall surface of the film which can be employed in this invention typically ranges from 2 to 20 weight percent, and preferably from 3 to 15 weight percent, based on the total weight of the polyolefin and the inorganic filler. When the amount of the organic substance adhering is less than 2 weight percent, the film having good durability for the oxidation cannot be obtained, while amounts of the organic substance of more than 20 weight percent reduce the wettability of the film and also remarkably increase electrical resistance. Furthermore, when the film to which surface the organic substance adheres in an amount of more than 20 weight percent is dipped in an aqueous sulfuric acid solution, the excess organic substance is reduced from the film so that the electrolytic solution of a battery is contaminated by the released organic substance. When the amount of the organic substance adhering is more than 20 weight percent, a further improvement in the durability of the film can not be gained due to the release of the excess organic substance.

A preferred amount of the organic substance adhering is from 3 to 15 weight percent. More specifically, for the general purposes the range of from 3 to 10 weight percent is more preferred and for uses where good durability is required the range of from 10 to 15 weight percent is more preferred. Thus, especially with respect to the film to which surface the organic substance adhering in an amount of 3 to 15 weight percent, the release of the organic substance can hardly be observed and the film obtained is well balanced between good durability and low electrical resistance.

The film to which surface the organic substance adheres in an amount of 15 to 20 weight percent can also be employed for uses where good durability is required although such a small amount of the release of the organic substance and an increase in the electrical resistance as not to affect the advantages of this invention are observed.

Still another important factor to the organic substance is a boiling point. Since lower boiling point organic substance such as lower boiling point hydrocarbons are not preferred for obtaining the effect of the present invention, there are usually employed organic substances having a boiling point of 100° C. or more. Especially when the film of the present invention is employed as a battery separator, the use of an organic substance having a boiling point of 100° C. or more is significant from a view point of the temperature condition of a battery.

Representative examples of the organic substances preferably employable in the present invention will be given hereinbelow. Each of the organic substances is accompanied by its SP value with parentheses. Examples of the best organic substances include petroleum hydrocarbons such as a naphthenic process oil (7.8–8.0), an aromatic process oil (8.0–8.3), a paraffinic process oil (7.6–7.8), and lubricating oils (7.6–8.0), e.g., a spindle oil, a machine oil, a cylinder oil.

Examples of better organic substances include such petroleum hydrocarbons as a liquid paraffin (7.5), a petroleum (7.5–7.7), an ozokelite (7.6–7.8), a petroleum asphalt (8.0–8.3) and a petroleum resin (7.8–8.2); such coal tar hydrocarbons as coumaron-indene resin (8.0–8.3), coal tar (8.2–8.3) and coal tar pitch (8.2–8.3); and such low molecular weight polyolefins as a polyethylene wax (7.9), a polyisobutylene (7.70), a polybutadiene (8.38) and an atactic polypropylene (8.1).

Examples of good organic substances include such fatty oils (8.3–8.39) as soya bean oil, castor oil, cotton seed oil, linseed oil, rapeseed oil, palm oil and coconut oil; such silicone oils as polydimethyl siloxane (7.3) and polymethylphenyl siloxane; polymer of β-pinene (7.5); hydrogenated rosin oil (8.2); and tris(nonylphenyl) phosphite (8.35).

The above-exemplified organic substances may be employed alone or in mixture thereof.

According to the present invention, there should be employed a polyolefin having a number average molecular weight of 15,000 or more, preferably, 17,000 to 50,000. The weight average molecular weight of the polyolefin is not critical, but the polyolefin having a weight average molecular weight of less than 600,000, preferably less than 300,000 may be employed. There is also no critical lower limit of the weight average molecular weight of the polyolefin to be employed in the present invention so long as the polyolefin has a number average molecular weight of 15,000 or more, but it is advantageous to employ a polyolefin having a weight average molecular weight of 70,000 or more. In general, there may preferably be employed a polyolefin having a weight molecular weight of 85,000 to 250,000. There may be employed a polyolefin having a standard load melt index of 0.01 or more, preferably 0.03 to 1. With use of such specific polyolefin, it is possible to form a flexible thin film having a thickness ranging from 0.05 to 1 mm. In contrast, when a polyolefin having a number average molecular weight of less than 15,000 is employed, a porous film obtained therefrom has a breaking elongation as low as less than 50% and is too brittle to be practically employed. Whereas in case a polyolefin having a weight average molecular weight of 600,000 or more is employed, it is difficult to reduce a film thickness to less than 0.3 mm and lower an electrical resistance per unit thickness, to wit, it is hard to obtain a film having a electrical resistance as low as 0.001 $\Omega dm^2$/sheet or less. To obtain a film having a low electrical resistance of 0.0006 $\Omega dm^2$/sheet or less, it is advantageous to employ a polyolefin having a weight average molecular weight of less than 300,000.

The term "polyolefin" used herein is intended to include homopolymers and copolymers of olefins and include, for example, polyethylene, polypropylene, polybutene, ethylenepropylene copolymer, ethylenebutene copolymer, ethylenepropylene-butene terpolymer, and mixtures thereof so long as they have a number average molecular weight of 15,000 or more. Of these resins, polyethylene or a copolymer of ethylene as a main component with other olefin is most preferable.

The inorganic filler employed serves to carry the organic liquid in the course of molding of the film, retaining the organic liquid to facilitate the molding. The inorganic filler also serves to impart wetting characteristics to the prepared film. The filler is preferably finely divided particles or porous particles having an average particle diameter ranging from 0.005 to 0.5$\mu$ and a specific surface area of 50 to 500, preferably 150 to 400 $m^2/g$. It is preferred to employ such an inorganic filler that it is capable of adsorbing thereon the organic liquid in an amount of at least its $\frac{2}{3}$ multiple by volume, preferably its 3 multiple by volume.

As specific examples of the inorganic fillers, there can be mentioned silica, calcium silicate, aluminum silicate, aluminum oxide, calcium carbonate, magnesium carbonate, kaolin clay, pulverized talc, titanium oxide, diatomaceous earth, etc. Two or more kinds of fillers may be employed in combination. In this case, one of the fillers is to have a hydrophilic property so that the resulting microporous film has a desired wettability. For an electrolytic separator and a lead accumulator which uses acid electrolyte, silica is preferably employed.

In the matrix to be treated with an organic substance, the amount ratio of the polyolefin and the inorganic filler is 40 to 90 volume percent to 10 to 60 volume percent. When the intended use of a microporous film to be made from the matrix is a separator, the ratio is preferably 50 to 80 volume percent (polyolefin) to 20 to 50 volume percent (filler) and more preferably 60 to 70 volume percent to 30 to 40 volume percent. In case the amount of the filler employed exceeds 60 volume percent, the film to be obtained from the matrix is poor in flexibility and not practically employable even if a polyolefin having a number average molecular weight of 15,000 or more is employed. Whereas, in case the amount of the filler employed is less than 10 volume percent, the strength of the film to be obtained from the matrix increases but the wetting characteristics thereof is so reduced that the film to be obtained from the matrix cannot be utilized for a separator.

The microporous film of the present invention comprises a matrix comprising a polyolefin and an inorganic filler. Said matrix has a web structure of polyolefin which defines a network void in the matrix. The void opens at the surface of the film and an average diameter of the opening portion of the void is in the range of 0.03 to 0.5$\mu$. The network void contains the filler attached thereto, leaving a space forming a path communicating from one surface of the film to the opposite surface of the film.

The term "void" used herein has a meaning as apparent from the above description and more illustratively it means a void portion defined by the polyolefin web structure but having the filler contained therein. The term "void space" used herein has a meaning as apparent from the above description and more illustratively it means a space left in the void and formed by cooperation between the particles of filler contained therein and cooperation between the wall of the void and the particles of filler contained therein. The term "void space rate" used herein is intended to mean a volume rate of void spaces formed in the whole structure of the matrix.

The actual average diameter of the void in the state where the filler is attachedly disposed, namely the average diameter of the opening portion of the void space is as small as 0.01 to 0.1$\mu$. The thus formed matrix has therein a void space rate of 30 to 75 volume percent based on the volume of the film. In case the void space rate is less than 30 volume percent, the electrical resistance increases and the film to be obtained upon being applied with the organic substance cannot be effectively employed for the separator. Whereas, in case the void space rate exceeds 75 volume percent, the strength of the film obtained is so reduced that the film to be obtained upon applied with the organic substance cannot be practically utilized. To meet the requirements both of strength and electrical resistance, the void space rate is preferably within the range of 45 to 65 volume percent. Further, in order that the microporous film may have a desired electrical resistance and a void space of a size suitable for preventing the passage of solid materials and permitting ions to pass through while maintaining a mechanical strength, the average diameter of the void is to be in the range of 0.03 to 0.5$\mu$ and more preferably in the range of 0.08 to 0.3$\mu$.

The film which comprises a matrix comprising a polyolefin and an inorganic filler and having therein void spaces may be produced, for example by a method as illustrated below but a method is not limited thereto.

Essentially, according to the present invention, 10 to 60 volume percent of a polyolefin, 7 to 42 volume percent of an inorganic filler and 30 to 75 volume percent of an organic liquid having a SP of from 8.4 to 9.9 inclusive are blended, the amount of the polyolefin being $\frac{2}{3}$ to 9 multiple of the amount of the inorganic filler, and the resulting blend is subjected to molding to form a film, followed by extraction of the organic liquid from the film to obtain a filmy matrix having therein void spaces.

More specifically, based on the total volume of a polyolefin, an inorganic filler and an organic liquid, 6 to 35 volume percent inorganic filler and 30 to 75 volume percent organic liquid are blended using an ordinary mixer such as a Henschel mixer or V-shaped tumbler to adsorb the organic liquid onto the surface of the filler particles. The conditions of the above blending vary slightly according to kind and rotation speed of the mixer used, but usually the blending is accomplished at room temperature for about one minute. A polyolefin is then mixed with the above obtained blend in an amount of 10 to 60 percent by volume but ⅔ to 9 multiple by weight based on the inorganic filler. The above-mentioned blending of three components is effected in two-stage but instead there may be employed a one-stage blending operation. When the two-stage blending is employed, good handling characteristics and excellent dispersion of the component can be attained. Whilst, when the one-stage blending is employed, the polyolefin tends to be wetted with the organic liquid so that good dispersion of the components cannot be attained. In such case, however, the dispersion of the three components can be attained by adjusting rotation speed of the mixer, blending time, etc.

The resulting polyolefin-filler-organic liquid blend is kneaded by a kneading machine such as an extruder, a Banbury mixer, a mixing twin roll, a kneader, etc. The so kneaded material is subjected to molding to be formed in a film having a thickness of 0.05 to 1 mm. Typical examples of the molding are extrusion molding employing a T-die or inflation method, calender molding, compression molding, injection molding, etc. The T-die extrusion molding is especially preferable to form a film as thin as 0.05 to 1 mm, especially 0.10 to 0.30 mm. The molding may be effected under molding conditions as ordinarily employed in molding of polyolefins as far as the molding is effected at a temperature higher than the melting point of the polyolefin employed and below the boiling point of the organic liquid employed.

The kneading step as described above is optional in the method of the present invention. Particularly, when the extrusion molding in which the kneading is also conducted simultaneously, the separate step for kneading is not necessary. But when the kneading step is positively employed, the bulk density of the blend can be appropriately controlled and, at the same time, good dispersion of the components can be attained, leading to improvement of handling characteristics and reduction of pin holes of the product film. Such reduction of pin holes is particularly important for a battery separator and separators of various electrolytical apparatus.

The organic liquid is extracted from the molded film at a temperature below a melting point of the polyolefin by a solvent for the organic liquid employed, to form a matrix comprising 40 to 90 volume percent polyolefin and 10 to 60 volume percent inorganic filler and having a void space rate of 30 to 75 volume percent based upon the film volume.

The organic liquid employable in the present invention is preferably to keep a liquid state when subjecting to the molding, the readily soluble in general organic solvents or water and be easily extractible from the molded film. The organic liquid is selected from ones having a SP value of 8.4 to 9.9, preferably from 8.6 to 9.4. An organic liquid having a SP of more than 9.9, when used in the method of the present invention, forms coarse pores or voids as large as more than 0.5μ in an average diameter and the resultant film has a poor elongation and is brittle. On the other hand, when an organic liquid having a SP of less than 8.4, the breaking strength and elongation are improved but the electrical resistance is also increased.

It should be noted that, according to the present invention, with use of an organic liquid having a SP of 8.4 to 9.9 as well as a polyolefin having a number average molecular weight of 15,000 or more, there is obtained a matrix of a specific construction in which the polyolefin constitutes a web structure defining a network of void in which the filler attachedly contained, leaving a space to form a path communicating from one surface of the film to the opposite surface thereof, said void having an average void diameter ranging from 0.03 to 0.5μ.

Representative examples of the organic liquid having a SP ranging from 8.4 to 9.9 inclusive are phthalic acid esters such as diethyl phthalate (DEP), dibutyl phthalate (DBP), and dioctyl phthalate (DOP); fatty acid esters such as dioctyl sebacate (DOS) and dioctyl adipate (DOA); maleic acid esters such as dibutyl maleate; trimellitic acid esters such as trioctyl trimellitate (TOTM); phosphoric acid esters such as tributyl phosphate (TBP), octyl diphenyl phosphate; other esters; and the like.

The solvent employable for extracting the organic liquid from the molded film is selected from those capable of dissolving the organic liquid but not dissolving the polyolefin used.

Representative examples of the solvent to be employed for extracting the organic liquid include alcohols such as methanol, ethanol and iso-propanol; ketones such as acetone; chlorine-substituted hydrocarbons such as trichloroethylene and 1,1,1-trichloroethane; and the like. The extraction of the organic liquid from the molded film may be conducted employing various methods ordinarily employed in the art, for example batch type dipping method, counter-flow method and the like (U.S. Pat. No. 3,351,495 may be referred to).

Since the average diameter of the void of the matrix is in an appropriate range, i.e., 0.03 to 0.5μ and the SP value of the organic liquid employed in the present invention is 8.4 or more, far off from the SP value of polyolefin of 7.7 to 8.2, almost all organic liquid, e.g., 98% or more of organic liquid is easily extracted at a room temperature in a few minutes.

According to the present invention, it is not necessary to remove by extraction all of the organic liquid used and there may remain in the matrix the organic liquid. However, if the extraction is not effected sufficiently, the porosity or void space rate is lowered, which is of course undesirable to the film to be made from the matrix when the film is employed as a separator. The acceptable residual rate of the organic liquid is generally 5 or less volume percent, preferably 2 or less volume percent based on the matrix.

After extraction of the organic liquid, the matrix may optionally be subjected to drying, for example drying at a room temperature under an atmospheric or reduced pressure heated air drying or contact heating drying.

Though the thus obtained film is substantially formed of a polyolefin and an inorganic filler and has fine pores, an antioxidant, lubricant or plasticizer may be added in the range where the properties of the film to be made from the matrix have not been spoiled.

The thus obtained filmy matrix comprising a polyolefin and an inorganic filler and having void spaces is subsequently subjected to impregnation with an organic substance or the so-called oil adhesion treatment. The adhesion of the organic substance to the overall surface of the film may be easily attained by applying the organic substance to the matrix using a dipping method, a spraying method, a coating method by means of a knife coater or a roll coater, etc. It is preferred that the application of the organic substance is uniformly effected not only to the surfaces of the filmy matrix but also to the surfaces of the polyolefin walls defining the void spaces formed in the filmy matrix in cooperation with the organic filler. The organic substance to be employed as the impregnating liquid may be used as such or in the form of a solution of it in a suitable solvent. The kind of solvent is not critical, but any of those solvents capable of dissolving the organic liquid may be employed as far as the polyolefin is substantially insoluble or inert to it and the solvent has a boiling point which is lower than that of the organic substance and than the melting point of the polyolefin employed. Representative examples of the solvent for the organic substance include alcohols such as methanol, ethanol and isopropanol; ketones such as acetone and methyl ethyl ketone; chlorine-substituted hydrocarbons such as trichloroethylene and 1,1,1-trichloroethane; petroleum ether; lower boiling point hydrocarbons such as heptane and hexane; and the like.

In applying the organic substance to the filmy matrix by the dipping method, it is preferred to effect dipping using a 1.5 to 15% by weight solution of the organic substance for 10 seconds to several ten minutes. The spraying method and the coating method may preferably be conducted using a 1.5 to 20% solution of the organic substance. In any applying method, the concentration of the solution and the time of application are controlled so that the organic substance adhering to the overall surface of the film may be 2 to 20 weight percent based on the total weight of the polyolefin and the inorganic filler. After completion of the application to the filmy matrix of the organic substance, the resulting film may, if desired, be subjected to drying at a temperature below the melting point of the polyolefin to remove the solvent. The drying may be effected, under an atmospheric pressure or reduced pressure, using an ordinary method such as a drying by heated air, heated roll or the like. In order that the uniform adhesion of the organic substance may be attained, it is preferred to conduct dyring of the organic substance-applied film at least 10 seconds after the application of the organic substance to the filmy matrix.

Referring now to FIGS. 1, 2 and 3, there is demonstrated superiority of the microporous film of the present invention.

In FIG. 1, the water absorption is plotted against the time of immersion of the porous film in water (dipping time), and the microporous film of the present invention is compared, with respect to wettability, with the film of U.S. Pat. No. 3,351,495. The water absorption characteristics of the filmy matrix which is prepared by the method employed in the present invention but not treated for oil-impregnation (untreated film) is also shown in the graph. The data shown in FIG. 1 are of the films prepared in the respective Examples and Comparative Examples are identified in FIG. 1. In the films of the present invention shown in FIG. 1, naphthenic process oil is employed as the organic substance for imparting oxidation resistance (same in FIGS. 2 and 3 too). In the films of U.S. Pat. No. 3,351,495 shown in FIG. 1, naphthenic process oil (in U.S. Pat. No. 3,351,495 the term "petroleum oil" is used) is employed as the organic liquid for formation of pores and extracted, with a part thereof being left as it remains unextracted (same in FIGS. 2 and 3 too).

As is clear from FIG. 1, the present film having an oil content of 5.2 wt.% has an excellent wettability and shows a water absorption of 100% instantaneously (within 1 second) like the untreated film. Even with the oil content of 9.8 wt.% or 14.9 wt.%, the film of the present invention has an excellent wettability and shows a water absorption of 100% within several seconds. In contrast, the wettability of the so-called oil-remaining film of U.S. Pat. No. 3,331,495 is poor. Even with the oil content of 0%, the oil remaining film shows poor wettability. The wettabilities of the oil-remaining films respectively having oil contents of 9.5 wt.% and 19 wt.% are very poor and their water absorptions are as low as less than 50%.

The excellent wettability of the so-called oil-impregnated film of the present invention enables a dry type lead accumulator to be operated immediately after sulfuric acid is introduced therein.

In FIG. 2, the electrical resistance is plotted against the oil content (adhering amount of organic substance), and the oil-impregnated film of the present invention is compared, with respect to electrical resistance, with the oil-remaining film. As is clear from FIG. 2, with oil content in the range of up to 15 wt.%, the oil-impregnated film of the present invention shows, with respect to electrical resistance, an increase rate as low as 0.00004 $\Omega dm^2/0.1$ mm with a 1% increase in oil content. With the oil content in the range of over 15 wt.%, the rate of increase of electrical resistance becomes large, and it rises sharply with the boundary point at 15 wt.%. In contrast, in spite of its being relatively large in void space rate as shown in FIG. 3, the oil-remaining film has a high electrical resistance. Particularly, it should be noted that with a 1% increase of the oil content, the electrical resistance of the oil-remaining film increases at a rate twice as high as that of the oil-impregnated film of the present invention.

As is easily understood from the foregoing, the microporous film of the present invention has an excellent oxidation resistance without sacrifice of excellent wettability and low electrical resistance which the untreated film inherently has. The superiority of the oil-impregnated microporous film of the present invention to the oil remaining film is illustrated in Table 1.

TABLE 1

| Materials (vol. %) | | Oil-remaining film PE/silica/process oil (15/15/70) | | | Oil-impregnated film PE/silica/DOP (25.6/13.6/60.8) | | | |
|---|---|---|---|---|---|---|---|---|
| Process oil content | wt. % | 0 | 9.5 | 19 | 0 | 5.2 | 9.8 | 14.9 |
| Void Space rate | % | 72 | 65 | 57 | 55 | 54 | 52 | 50 |
| | $10^{-5} \Omega dm^2$ sheet | 71 | 101 | 118 | 42 | 46 | 48 | 55 |
| Electrical resistance | $10^{-5} \Omega dm^2$ 0.1 mm | 26 | 36 | 42 | 21 | 23 | 24 | 28 |
| Oxidation resistance | Short-circuiting time. hrs. | >100 | >200 | >200 | >100 | >200 | >200 | >200 |

TABLE 1-continued

| Materials (vol. %) | | Oil-remaining film PE/silica/process oil (15/15/70) | | | Oil-impregnated film PE/silica/DOP (25.6/13.6/60.8) | | | |
|---|---|---|---|---|---|---|---|---|
| Process oil content | wt. % | 0 | 9.5 | 19 | 0 | 5.2 | 9.8 | 14.9 |
| test | Elongation after 48-hr oxidation resistance test | 12 | 120 | 180 | 2 | 330 | 345 | 355 |

Note
PE: polyethylene

As described, the microporous film according to the present invention consisting essentially of a matrix comprising 40 to 90 volume percent of a polyolefin having a number average molecular weight of 15,000 or more and 10 to 60 volume percent of an inorganic filler, said matrix having therein void spaces at a rate of 30 to 75 volume percent based on the volume of the film; and 2 to 15 weight percent, based on the total weight of the polyolefin and the inorganic filler, of a specific organic substance. For use as a battery separator in which excellent flexibility, wettability and durability are particularly required, there is preferably employed a microporous film which comprises a matrix comprising 50 to 80 volume percent to the polyolefin and 20 to 50 volume percent of the inorganic filler, said matrix having therein void spaces at a rate of 50 to 70 volume percent based on the volume of the film; and 3 to 15 weight percent, based on the total weight of the polyolefin and the inorganic filler, of the organic substance.

The microporous film of the present invention has a thickness of 0.05 to 1 mm. The film thickness may be for a separator preferably within the range of 0.10 to 0.30 mm from a view point of good moldability to a film and sufficient strength of the resulting film.

The microporous film has an excellent durability, especially a high oxidation resistance substantially without sacrifice of such properties as the excellent mechanical strength, flexibility and wettability as well as the low electrical resistance. Due to the excellent properties as mentioned above, the microporous film of this invention has a wide variety of uses, for example, as a battery separator, filter, liquid retainer, wrapping material, synthetic paper, etc. In view of its extremely low electrical resistance and high oxidation resistance in an electrolyte, the microporous film of the present invention is applicable with great advantage especially for a battery separator and a separator in various electrochemical or electrolytical apparatuses.

The present invention will now be described in detail by reference to the following Examples that by no means limit the scope of the present invention.

The properties shown herein were measured in the following method.

Weight average molecular weight ($\bar{M}w$), Number average molecular weight ($\bar{M}n$):
  GPC measuring apparatus—Model 200 manufactured by Waters Assoc. Co.
  Column—G 700S—G 3000S manufactured by Toyo Soda Kogyo K.K.
  Solvent—trichlorobenzene
  Measuring temperature—135° C.

Viscosity average molecular weight ($Mv \approx Mw$):
  Measured by using decalin at a temperature of 135° C.
  $[\eta] = 6.20 \times 10^{-4} \, Mv^{0.70}$ (Formula of Chiang) The average molecular weight of polyethylene having SLMI of 0 was measured according to this method and then calculated.

Composition ratio (volume percent): Calculated from the value obtained by dividing the amounts of the respective materials charged by their respective true specific gravities.

Porosity (Void space rate) (%):
  Void space volume/film volume $\times$ 100
  (Void space volume = weight of water-saturated film-weight of dry film)

Average void diameter ($\mu$): Weighted average calculated from average of long and short diameters of 200 voids appearing on the surface of the film in a scanning electron photomicrograph of the surface of the film with the inorganic filler extracted.

Specific surface area (m$^2$/g): Measured according to BET absorption method

Average void space diameter ($\mu$): Calculated from specific surface area measured by BET absorption method $$d = \frac{2V}{S} \quad \begin{array}{l} d\text{: diameter } (\mu) \\ S\text{: specific surface area (m}^2\text{/g)} \\ v\text{: void space volume (ml/g)} \end{array}$$

Adhering amount (weight percent): Calculated by the formula $$\frac{W_2 - W_1}{W_3} \times 100$$

wherein
  $W_1$: weight of film before adhesion treatment
  $W_2$: weight of film after adhesion treatment
  $W_3$: weight of polyolefin and inorganic filler of film Water absorption (%): Calculated by the formula $$\frac{W_2' - W_1'}{W_3' - W_1'} \times 100$$

wherein
  $W_1'$: weight of dried film
  $W_2'$: weight of film after dipped in water for a given period of time
  $W_3'$: weight of water-saturated film
  Weight of water-saturated film: Weight of film after dipped in a 5 weight percent aqueous solution of NOIGEN EG-120 (trade name of a nonionic surface active agent of nonylphenol polyoxyethylene manufactured and sold by Daiichi Kogyo Seiyaku Kabushiki Kaisha, Japan) for 1 hour and then washed with water for 1 hour.

Breaking strength (kg/cm$^2$) and Breaking elongation (%): Measured substantially according to ASTM-D-882 using an Instron type tension tester (an initial strain rate = 2.0 mm/mm·min.)

Electrical resistance ($\Omega dm^2$/sheet $\Omega dm^2$/0.1 mm): Measured using diluted sulfuric acid having a specific gravity of 1.2 according to JIS-C-2313

Air permeability (sec/100 ml): Measured according to ASTM D-726, Method A

Melt index (SLMI): Measured according to ASTM-D-1238-65T Condition E

Solubility parameter (SP): Calculated by the formula of P.A. Samll $$\frac{d\Sigma G}{M}$$

wherein
G: molar attraction constant
d: specific gravity
M: molecular weight

Oxidation resistance:
Short-circuiting period of time (hour) A period of time until the voltage drops by 0.2 V or more from the initial voltage or it drops to below 2.6 V in an oxidation resistance test that a film of 7 cm×7 cm is sandwitched, under a load of 5 kg, by lead plates of 5 cm×5 cm which serve as a cathode and an anode, respectively, put in a 50° C. aqueous sulfuric acid solution having a specific gravity of 1.30, and applied with a constant current of 2.5 A.

Breaking elongation after 48 hours (%) Measured substantially according to ASTM-D-882 using an Instron type tension tester (an initial strain rate=2.0 mm/mm·min) after subjected to 48 hour oxidation resistance test and dried.

EXAMPLE 1

13.6 volume percent of NIPSIL VN-3 [trade name of finely divided silica manufactured and sold by Nippon Silica Industrial Co., Ltd., Japan (specific surface area: 280 m$^2$/g, average diameter of particles: 16 m$\mu$)] and 60.8 volume percent of dioctyl phthalate [DOP (SP: 8.9)] were mixed in a Henschel mixer and further mixed with 25.6 volume percent of SUNTEC S-360 P [trade name of polyethylene manufactured and sold by Asahi Kasei Kogyo Kabushiki Kaisha, Japan ($\overline{Mw}$: 85,000, $\overline{Mn}$: 21,000, SLMI: 1)] in this mixer.

By a twin extruder having a diameter of 30 mm, the blend was kneaded, extruded and pelletized. These pellets were extruded to form a film using an extruder having a T-die of 420 mm width attached thereto, at an extruding rate of 12.5 kg/hr, an extruding speed of 2 m/min and a resin pressure of 65 kg/cm$^2$.

The extruded film was immersed in CHLOROTHENE (trade name of 1,1,1-trichloroethane manufactured and sold by Asahi Dow Ltd., Japan) for 5 minutes to extract DOP. The porous film thus obtained has a thickness of 0.195 mm, a void space rate of 55% and an electrical resistance of 0.00042 $\Omega dm^2$/sheet. The matrix of the porous film was composed of 65.3 volume percent of polyethylene and 34.7 volume percent of finely divided silica. This porous film had an oxidation resistance of 162 hours in terms of short-circuiting time in the oxidation resistance test as specified before and 2% in terms of breaking elongation when measured after 48 hour oxidation resistance test.

The porous film was then dipped in 4 weight percent CHLOROTHENE solution of SONIC R-200 [trade name of a naphthenic process oil manufactured and sold by Kyodo Oil Co., Ltd., Japan (SP: 7.9)] for 10 minutes and then dried with hot air of 70° C. The naphthenic process oil adhered to the film in an amount of 5.2 weight percent based on the total weight of the polyethylene and the finely divided silica. Even after the application of the naphthenic process oil, the film still kept a void space rate as large as 54% and an electrical resistance as small as 0.00045 $\Omega dm^2$/sheet. However, the oxidation resistance or durability was much improved, that is, the short-circuiting period of time in the oxidation resistance test was prolonged to more than 200 hours and the breaking elongation after 48 hour oxidation resistance test was enhanced up to 330%. The moment water was dropped on the film, it was absorbed.

EXAMPLE 2

The porous film prepared in Example 1 which was not treated with the naphthenic process oil was dipped in 3.5 weight percent CHLOROTHENE solution of PICCOLYTE A-115 [trade name of polymer of $\beta$-pinene manufactured and sold by Esso Standard Co., Ltd., United States (SP: 7.5)] for 5 minutes and then dried. The polymer of $\beta$-pinene adhered to the film in an amount of 4.2 weight percent based on the total weight of the polyethylene and finely divided silica.

The electrical resistance of the thus obtained porous film was 0.00046 $\Omega dm^2$/sheet. The film showed such an excellent flexibility and durability that its short-circuiting period of time was more than 200 hours and its breaking elongation was 200% even after 48 hour oxidation resistance test.

EXAMPLES 3 to 9

The porous film prepared in Example 1 which were not treated with the naphthenic process oil were treated with various organic substances under varied conditions as designated in Table 2. The results are shown in the same Table. The treated porous film each showed low electrical resistances and excellent durabilities.

EXAMPLE 10

Substantially the same procedures as of Example 1 were repeated to prepare a porous film except that polyethylene having a weight average molecular weight of 330,000, a number average molecular weight of 20,000 and an SLMI of 0 was employed. The obtained film had a thickness of 0.22 mm. The naphthenic process oil adhered to the film in an amount of 4.9 weight percent based on the total weight of the polyethylene and the finely divided silica. The void space rate of the film was 51% and the electrical resistance thereof was 0.00072 $\Omega dm^2$/sheet. The short-circuiting period of time was more than 200 hours and the breaking elongation was 240% when measured after 48 hour oxidation resistance test.

EXAMPLE 11

Substantially the same procedures as of Example 1 were repeated to prepare a porous film except that 15 volume percent of polyethylene having a weight average molecular weight of 600,000, 17 volume percent of finely divided silica, and 68 volume percent of DOP were employed. The naphthenic process oil adhered to the film in an amount of 10.9 weight percent based on the total weight of the polyethylene and the finely divided silica. The obtained film has a void space rate of 64% and an electrical resistance of 0.00062 $\Omega dm^2$/sheet (film thickness: 0.28 mm). The short-circuiting period of time was more than 200 hours and the breaking elongation was 130% when measured after 48 hour oxidation resistance test.

COMPARATIVE EXAMPLE 1

Substantially the same procedures as of Example 1 were repeated to prepare a porous film except that a naphthenic process oil, SONIC R-200, was employed as an organic liquid and a petroleum ether was employed is an extractant. The obtained film contained the naphthenic process oil remaining unextracted in an amount of 5.4 weight percent based on the total weight of the polyethylene and the finely divided silica. The breaking elongation was 143%. The short-circuiting period of time was more than 200 hours and the breaking elongation after 48 hour oxidation resistance test was 68%. Thus, the film had a fairly good elongation. The electrical resistance of the film, however, was as high as 0.00148 $\Omega dm^2$/sheet (film thickness: 0.21 mm). When water was dropped on the film, water remained on the film in the form of waterdrops.

COMPARATIVE EXAMPLE 2

Substantially the same procedures as of Comparative Example 1 were repeated to prepare a porous film except that 15 volume percent of polyethylene having a weight average molecular weight of 330,000, a number average molecular weight of 20,000 and a SLMI of 0, 15 volume percent of finely divided silica and 70 volume percent of a naphthenic process oil, SONIC R-200, were employed. The obtained film contained the naphthenic process oil remaining unextracted in an amount of 6.0 weight percent based on the total weight of the polyethylene and the finely divided silica. The obtained film has a void space rate of 56% and an electrical resistance of 0.00070 $\Omega dm^2$/sheet (film thickness: 0.22 mm). The breaking elongation of the film, however, was small as 52%. The short-circuiting period of time was more than 200 hours, but the breaking elongation after 48 hour oxidation resistance test was 28%. Thus, the film showed its brittleness.

COMPARATIVE EXAMPLE 3

The porous film prepared in Example 1 was treated with a naphthenic process oil, SONIC R-200, so that is adhered to the film in an amount of 1.7 weight percent based on the total weight of the polyethylene and the finely divided silica. The obtained film had a void space rate of 55% and an electrical resistance of 0.00042 $\Omega dm^2$/sheet (film thickness: 0.195 mm). The short-circuiting period of time was 186 hours but the breaking elongation after 48 hour oxidation resistance test was as low as 15%. Thus, the film showed no effect of the application of the naphthenic process oil.

COMPARATIVE EXAMPLE 4

Substantially the same procedures as of Comparative Example 3 were repeated to prepare a porous film except that the naphthenic process oil was applied to the film so as to adhere thereto in an amount of 20.8 weight percent based on the total weight of the polyethylene and the finely divided silica. The obtained film had a void space rate of 47.3% and an electrical resistance of 0.00066 $\Omega dm^2$/sheet. When the film was immersed in a 40% aqueous sulfuric acid solution, the naphthenic process oil was partially released from the film. The amount of the naphthenic process oil adhering to the film was decreased to 15.8% after one day. The film was poor in wettability.

COMPARATIVE EXAMPLE 5 to 7

Substantially the same procedures as of Comparative Example 2 were repeated to prepare a porous film except that polyethylene having a weight average molecular weight of 560,000 and an SLMI of 0 was employed. In the extraction of the naphthenic process oil, the extraction time was varied to obtain films each containing the process oil remaining unextracted in amounts of 0 volume percent, 9.5 volume percent and 19.0 volume percent based on the matrix, respectively. The performances of these films are shown in Table 3. The wettability and the electrical resistance of each of the films are shown in FIGS. 1 and 2, respectively. As apparent from FIGS. 1 and 2, the wettability and the electrical resistance of these films were much inferior to those of the films obtained in Examples 1, 6 and 8, respectively.

TABLE 2

| | Materials | | | | | | | Composition of film | | |
| --- | --- | --- | --- | --- | --- | --- | --- | --- | --- | --- |
| | Polyolefin | | Inorganic filler | | Organic liquid | | | Polyolefin Vol. % | Inorganic filler Vol. % | Organic liquid Vol % |
| | Kind | Vol. % | Kind | Vol % | Kind | SP | Vol. % | | | |
| Example 1 | HDPE $\overline{Mw} = 85,000$ $\overline{Mn} = 21,000$ | 25.6 | finely divided silica | 13.6 | DOP | 8.9 | 60.8 | 65.3 | 34.7 | 0 |
| Example 2 | HDPE $\overline{Mw} = 85,000$ $\overline{Mn} = 21,000$ | " | finely divided silica | " | " | " | " | " | " | " |
| Example 3 | HDPE $\overline{Mw} = 85,000$ $\overline{Mn} = 21,000$ | " | finely divided silica | " | " | " | " | " | " | " |
| Example 4 | HDPE $\overline{Mw} = 85,000$ $\overline{Mn} = 21,000$ | " | finely divided silica | " | " | " | " | " | " | " |
| Example 5 | HDPE $\overline{Mw} = 85,000$ $\overline{Mn} = 21,000$ | " | finely divided silica | " | " | " | " | " | " | " |
| Example 6 | HDPE $\overline{Mw} = 85,000$ $\overline{Mn} = 21,000$ | " | finely divided silica | " | " | " | " | " | " | " |
| Example 7 | HDPE $\overline{Mw} = 85,000$ $\overline{Mn} = 21,000$ | " | finely divided silica | " | " | " | " | " | " | " |
| Example 8 | HDPE $\overline{Mw} = 85,000$ | " | finely divided | " | " | " | " | " | " | " |

TABLE 2-continued

| | | | | | | | | | | |
|---|---|---|---|---|---|---|---|---|---|---|
| Example 9 | $\overline{Mn}$ = 21,000<br>HDPE<br>$\overline{Mw}$ = 85,000 | " | silica<br>finely<br>divided | " | " | " | " | " | " | " |
| Example 10 | $\overline{Mn}$ = 21,000<br>HDPE<br>$\overline{Mw}$ = 330,000 | " | silica<br>finely<br>divided | " | " | " | " | 64.1 | 34.1 | 1.8 |
| Example 11 | $\overline{Mn}$ = 20,000<br>HDPE<br>$\overline{Mw}$ = 600,000 | 15 | silica<br>finely<br>divided<br>silica | 17 | " | | 68 | 46.9 | 53.1 | 0 |

| | Adhesion treatment | | Performance of treated film | | | |
|---|---|---|---|---|---|---|
| | Organic substance | Adhering amount | Film thickness | Void space rate, | Electrical resistance | |
| | Kind | SP | wt. % | mm | % | $10^{-5}\Omega dm^2$/sheet    $10^{-5}\Omega dm^2$/0.1 mm |
| Example 1 | naphthenic process oil | 7.9 | 5.2 | 0.195 | 54 | 45    22.5 |
| Example 2 | polymer of β-pinene | 7.5 | 4.2 | " | " | 46    23 |
| Example 3 | tris(nonyl-phenyl) phosphite | 8.35 | 7.8 | " | 53 | "    23 |
| Example 4 | aromatic process oil | 8.2 | 6.2 | " | " | 45    22.5 |
| Example 5 | paraffinic process oil | 7.6 | 2.0 | " | 55 | 43    21.5 |
| Example 6 | naphthenic process oil | 7.9 | 9.8 | " | 52 | 48    24 |
| Example 7 | naphthenic process oil | " | 13.5 | " | 51 | 51    26 |
| Example 8 | naphthenic process oil | " | 14.9 | | 50 | 55    28 |
| Example 9 | polydimethyl siloxane | 7.3 | 7.6 | " | 53 | 46    23 |
| Example 10 | naphthenic process oil | 7.9 | 4.9 | 0.220 | 51 | 72    36 |
| Example 11 | naphthenic process oil | " | 10.9 | 0.280 | 64 | 62    22 |

| | Performance of treated film | | | Performance of untreated film | | | |
|---|---|---|---|---|---|---|---|
| | Oxidation resistance | | | | | | Elongation after 48 hr oxidation resistance test, % |
| | Short-circuiting time hrs. | Elongation after 48 hrs % | Wett-ability*¹ | Void space rate % | Electrical resistance $10^{-5}\Omega dm^2$/sheet | $10^{-5}\Omega dm^2$/0.1 mm | |
| Example 1 | >200 | 330 | ⊚ | 55 | 42 | 21 | 2 |
| Example 2 | " | 200 | ⊚ | " | " | " | " |
| Example 3 | " | 254 | ⊚ | " | " | " | " |
| Example 4 | " | 305 | ⊚ | " | " | " | " |
| Example 5 | " | 86 | ⊚ | " | " | " | " |
| Example 6 | " | 345 | ⊚ | " | " | " | " |
| Example 7 | " | 310 | ⊚ | " | " | " | " |
| Example 8 | " | 355 | ⊚ | " | " | " | " |
| Example 9 | " | 185 | ⊚ | " | " | " | " |
| Example 10 | " | 240 | ⊚ | 52 | 66 | 33 | 8 |
| Example 11 | " | 130 | ⊚ | 68 | 50 | 18 | 20 |

*¹Wettability is evaluated with reference to the water absorption of the film after dipped in water for 10 seconds as follows:
85% to 100% : ⊚
80% to 95% exclusive : ○
50% to 80% exclusive : △
lower than 50% : x

TABLE 3

| | Material | | | | | | Composition of film | | |
|---|---|---|---|---|---|---|---|---|---|
| | Polyolefin | | Inorganic filler | | Organic liquid | | | Polyolefin Vol. % | Inorganic filler Vol. % | Organic liquid Vol. % |
| | Kind | Vol. % | Kind | Vol. % | Kind | SP | Vol. % | | | |
| Comparative Example 1 | HDPE<br>$\overline{Mw}$ = 85,000<br>$\overline{Mn}$ = 21,000 | 25.6 | finely divided silica | 13.6 | naphthenic process oil | 7.9 | 60.8 | 60.0 | 31.9 | 8.1 |
| Comparative Example 2 | HDPE<br>$\overline{Mw}$ = 330,000<br>$\overline{Mn}$ = 20,000 | 15 | finely divided silica | 15 | naphthenic process oil | " | 70 | 45.0 | 45.0 | 10.0 |
| Comparative Example 3 | HDPE<br>$\overline{Mw}$ = 85,000<br>$\overline{Mn}$ = 21,000 | 25.6 | finely divided silica | 13.6 | DOP | 8.9 | 60.8 | 65.3 | 34.7 | 0 |

TABLE 3-continued

| | | | | | | | | | | | |
|---|---|---|---|---|---|---|---|---|---|---|---|
| Comparative Example 4 | HDPE $\overline{M}w$ = 85,000 $\overline{M}n$ = 21,000 | | finely divided silica | | DOP | " | " | " | " | " | " |
| Comparative Example 5 | HDPE $\overline{M}w$ = 560,000 | 15 | finely divided silica | 15 | naphthenic process oil | 7.9 | 70 | 50.0 | 50.0 | | " |
| Comparative Example 6 | HDPE $\overline{M}w$ = 560,000 | " | finely divided silica | " | naphthenic process oil | " | " | 42.5 | 42.5 | 15.0 |
| Comparative Example 7 | HDPE $\overline{M}w$ = 560,000 | " | finely divided silica | " | naphthenic process oil | " | " | 37.0 | 37.0 | 26.0 |

| | Adhesion treatment | | | Performance of treated film | | | |
|---|---|---|---|---|---|---|---|
| | Organic substance | | Adhering amount | Film thickness | Void space rate | Electrical resistance | |
| | Kind | SP | Wt. % | mm | % | $10^{-5}\Omega dm^2$/sheet | $10^{-5}\Omega dm^2$/0.1 mm |
| Comparative Example 1 | — | — | 5.4*2 | 0.210 | 48 | <u>148</u> | 70 |
| Comparative Example 2 | — | — | 6.0*2 | 0.220 | 56 | 70 | 32 |
| Comparative Example 3 | naphthenic process oil | 7.9 | 1.7 | 0.195 | 55 | 42 | 21 |
| Comparative Example 4 | naphthenic process oil | " | 20.8 →15.8 | 0.195 | 47* | 66* | 33* |
| Comparative Example 5 | — | — | 0*2 | 0.275 | 72 | 71 | 26 |
| Comparative Example 6 | — | — | 9.5*2 | 0.280 | 65 | <u>101</u> | 36 |
| Comparative Example 7 | — | — | 19.0*2 | 0.280 | 57 | 118 | 42 |

| | Performance of treated film Oxidation resistance | | | Performance of untreated film | | | Elongation after 48 hr oxidation resistance test |
|---|---|---|---|---|---|---|---|
| | Short-circuiting time hrs. | Elongation after 48 hrs % | Wetta-bility*1 | Void space rate % | Electrical resistance | | |
| | | | | | $10^{-5}\Omega dm^2$/sheet | $10^{-5}\Omega dm^2$/0.1 mm | % |
| Comparative Example 1 | >200 | 68 | <u>x</u>*3 | | | | |
| Comparative Example 2 | " | <u>28</u> | <u>x</u> | | | | |
| Comparative Example 3 | 186 | <u>15</u> | ◉ | 55 | 42 | 21 | 2 |
| Comparative Example 4 | >200 | 340 | O | " | " | " | " |
| Comparative Example 5 | " | <u>24</u> | Δ | | | | |
| Comparative Example 6 | " | 120 | <u>x</u> | | | | |
| Comparative Example 7 | " | 180 | <u>x</u> | | | | |

*Performance of the film which the process oil was not released from. (It was measured the film that was immersed for 4 hrs. in a 40% aqueous sulfuric acid.)
*1Wettability is evaluated with reference to the water absorption of the film after dipped in water for 10 seconds as follows:
95% to 100%: ◉
80% to 95% exclusive: O
50% to 80% exclusive: Δ
lower than 50%: x
*2The amount of the organic liquid remaining unextracted in the film is designated in Table 3, assuming it to be an adhering amount.
*3The under line appended to the insufficient performance.

What is claimed is:

1. A method of manufacturing a microporous film which comprises: blending a polyolefin having a number average molecular weight of 15,000 or more, an inorganic filler, and an organic liquid (A) having a solubility parameter ranging from 8.4 to 9.9 inclusive in amounts of 10 to 60 volume percent, 7 to 42 volume percent, and 30 to 75 volume percent, respectively, based on the whole volume of the polyolefin-filler-organic liquid (A) composition, the amount of the polyolefin being ⅔ to 9 multiple of the amount of the inorganic filler; subjecting the resulting blend to molding to form a film; extracting from said film the organic liquid (A) to form a matrix which comprises 40 to 90 volume percent of the polyolefin and 10 to 60 volume percent of the inorganic filler and having therein void spaces at a rate of 30 to 75 volume percent based on the volume of the film; and applying to the matrix an organic substance (B) which is substantially insoluble in and inert to sulfuric acid and has a solubility parameter ranging from 7.3 inclusive to 8.4 exclusive so that said organic substance (B) adheres to the overall surface of the film in an amount of 2 to 20 weight percent based on the total weight of the polyolefin and the inorganic filler.

2. A method as set forth in claim 1, wherein said solubility parameter of the organic substance (B) is in the range of from 7.5 to 8.3 inclusive.

3. A method as set forth in claim 1, wherein said polyolefin has a weight average molecular weight of less than 600,000.

4. A method as set forth in claim 1, wherein said polyolefin has a weight average molecular weight of less than 300,000.

5. A method as set forth in claim 4, wherein said weight average molecular weight ranges from 85,000 to 250,000.

6. A method as set forth in claim 1, wherein said polyolefin has a number average molecular weight of 17,000 to 50,000.

7. A method as set forth in claim 1, wherein said polyolefin has a standard load melt index of 0.01 or more.

8. A method as set forth in claim 7, wherein said standard load melt index is in the range of 0.03 to 1.

9. A method as set forth in claim 1, wherein said polyolefin is an olefin homopolymer.

10. A method as set forth in claim 1, wherein said polyolefin is an olefin copolymer.

11. A method as set forth in claim 1, wherein said polyolefin is polyethylene.

12. A method as set forth in claim 10, wherein said polyolefin is an ethylene copolymer.

13. A method as set forth in claim 12, wherein said ethylene copolymer is an ethylene-propylene copolymer, an ethylene-butene copolymer or an ethylene-propylene-butene terpolymer.

14. A method as set forth in claim 12, wherein said polyolefin is a copolymer of ethylene as a main component with other olefin.

15. A method as set forth in claim 1, wherein said inorganic filler is finely divided silica.

16. A method as set forth in claim 1, wherein the amount of said organic substance (B) is 3 to 15 weight percent based on the total weight of the polyolefin and the inorganic filler.

17. A method as set forth in claim 1, wherein said organic substance (B) is a member selected from the group consisting of petroleum hydrocarbons, coal tar hydrocarbons, low molecular weight polyolefins, fatty oils, silicone oils, polymer of β-pinene, hydrogenated rosin oil, tris(nonylphenyl) phosphite, and mixtures thereof.

18. A method as set forth in claim 17, wherein the petroleum hydrocarbon is a member selected from the group consisting of a naphthenic process oil, an aromatic process oil, a paraffinic process oil, a lubricating oil, a liquid paraffin, a petroleum, an ozokelite, a petroleum asphalt, a petroleum resin, and mixtures thereof.

19. A method as set forth in claim 17, wherein the coal tar hydrocarbon is a member selected from the group consisting of coumaron-indene resin, coal tar, coal tar pitch, and mixtures thereof.

20. A method as set forth in claim 17, wherein the low molecular weight polyolefin is a member selected from the group consisting of a polyethylene wax, a polyisobutylene, a polybutadiene, an atactic polypropylene, and mixtures thereof.

21. A method as set forth in claim 17, wherein the fatty oil is a member selected from the group consisting of soya bean oil, castor oil, cotton seed oil, linseed oil, rapeseed oil, palm oil, coconut oil, and mixtures thereof.

22. A method as set forth in claim 17, wherein the silicone oil as a member selected from the group consisting of polydimethyl siloxane, polymethylphenyl siloxane, and mixtures thereof.

23. A method as set forth in claim 18, wherein said petroleum hydrocarbon is a member selected from the group consisting of a naphthenic process oil, an aromatic process oil, a paraffin process oil, and mixtures thereof.

24. A method as set forth in claim 18 wherein said petroleum hydrocarbon is a lubricating oil selected from the group consisting of a spindle oil, a machine oil, a cylinder oil and mixtures thereof.

25. A method as set forth in claim 1, wherein the application of said organic substance (B) to the matrix is carried out by dipping, spraying or coating.

26. A method as set forth in claim 1, wherein said organic substance (B) is applied to the matrix in the form of the organic substance (B) as it is or its solution.

27. A method as set forth in claim 25, wherein said dipping is carried out using a 1.5 to 15% by weight solution of the organic substance (B) in a solvent for 10 seconds or more.

28. A method as set forth in claim 25, wherein said spraying is carried out using a 1.5 to 20% by weight solution of the organic substance (B) in a solvent.

29. A method as set forth in claim 25, wherein said coating is carried out by a knife coater or roll coater using a 1.5 to 20% by weight solution of the organic substance (B) in a solvent.

30. A method as set forth in any of claims 27 to 29, wherein said solvent is a member selected from the group consisting of 1,1,1-trichloroethane, trichloroethylene, methanol, ethanol, isopropyl alcohol, acetone, methyl ethyl ketone, petroleum ether, heptane, and hexane.

31. A method as set forth in claim 1, wherein said solubility parameter of the organic liquid (A) is in the range of 8.6 to 9.4.

32. A method as set forth in claim 1, wherein said organic liquid (A) is dioctyl phthalate or trioctyl trimellitate.

33. A method as set forth in claim 1, wherein said matrix further contains 5 or less volume percent based on the matrix of the organic liquid (A) having a solubility parameter ranging from 8.4 to 9.9 inclusive, said organic liquid (A) remaining unextracted.

* * * * *